Nov. 30, 1943.  H. PFLEUMER  2,335,309
PRESSURE CHAMBER
Filed July 18, 1939  2 Sheets-Sheet 1

INVENTOR.
Hans Pfleumer
BY Ostrolenk & Greene
ATTORNEYS

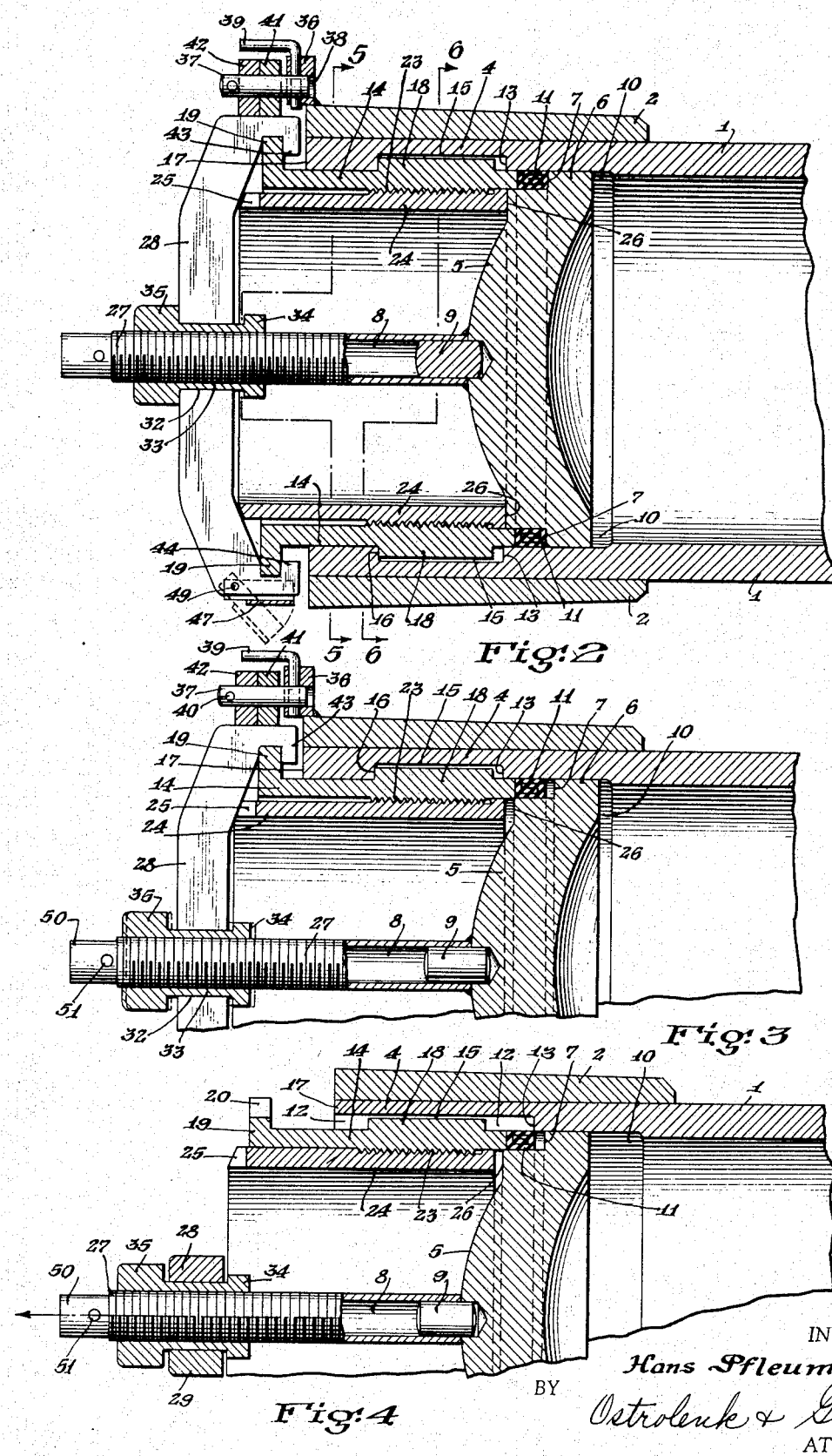

Patented Nov. 30, 1943

2,335,309

UNITED STATES PATENT OFFICE 2,335,309

PRESSURE CHAMBER

Hans Pfleumer, New Brunswick, N. J., assignor to Rubatex Products, Inc., New York, N. Y., a corporation of Delaware Application July 18, 1939, Serial No. 285,052

4 Claims. (Cl. 220—25)

My invention is a continuation in part of my application for improvements in Pressure chamber, filed April 26, 1938, United States Serial No. 204,482, now Patent No. 2,258,804, and relates to a novel pressure chamber.

More specifically, my invention relates to a novel apparatus for effecting the secure closing and tight sealing of a pressure chamber or autoclave, whereby the sealing pressure is supplied by the internal pressure and the sealing means is prevented from being overcompressed.

In certain manufactures, the use of high pressure autoclaves is indicated where it is desired to effect treatments under pressure of the order of 4,000 to 5,000 pounds per square inch. Such pressures are employed for example, in the manufacturing of gas expanded rubber. It is exceedingly difficult to seal such high pressure chambers against leakage, and even more difficult to effectively maintain a gasket as a lid seal without injury to the gasket during each pressure operation. Because of the flow of the seal under pressures involved, it often is very difficult to separate the lid from the chamber after the pressure operation is completed.

I have devised a novel autoclave and closure and sealing means therefor, whereby the chamber may be effectively sealed during the pressure operation and readily opened after the pressure operation. I regulate the pressure upon the sealing gasket which is positioned on the closure lid of the autoclave so that irrespective of the high pressure exerted upon the lid, the pressure upon the sealing gasket never is more than a desired low pressure for example 260 pounds per square inch.

It is an object of my invention to provide a novel autoclave in which an effective low pressure seal is effected.

It is another object of my invention to provide an autoclave wherein the gasket carried by the lid is protected from overcompression.

It is a further object of my invention to provide a novel arrangement of autoclave lid, pressure sleeve and thrust ring whereby the thrust ring prevents the lid from compressing the gasket against the pressure sleeve.

It is still a further object of my invention to provide a novel closure arrangement whereby a closure member for a high pressure autoclave may be easily and quickly placed on the autoclave and whereby the removal of said closure from the autoclave after the pressure operation may be accomplished with speed and facility by simplifying the operations required for said removal and by reducing the number of said operations, and by making it possible to remove all parts of the autoclave closure as one unit.

It is a further object of my invention to provide a high pressure autoclave wherein pressures on the order of 3,000 to 5,000 pounds per square inch are employed whereby the gasket which effects the seal of the lid is maintained under a pressure on the order of 260 pounds per square inch or about 5% of the internal pressure.

It is another object of my invention to provide a means whereby varying grades of softness of the gasket can be employed and maintained under respective optimum pressures by virtue of the adjustability of gasket pressure.

Other objects and uses of my invention will, in part, be apparent and, in part, pointed out in the following description and drawings in which:

Figure 2 is a cross-sectional view taken on the line 2—2 of Figure 1 and showing the position of the various parts of the closure member during the pressure operation.

Figure 3 is a view corresponding to that of Figure 2 showing the position of the various parts of the autoclave closure just before the removal operation.

Figure 4 is a view corresponding to that of Figure 2 but taken on the line 4—4 of Figure 1 and showing the position of the various parts of the autoclave closure during the progress of the removal operation.

Figure 1:
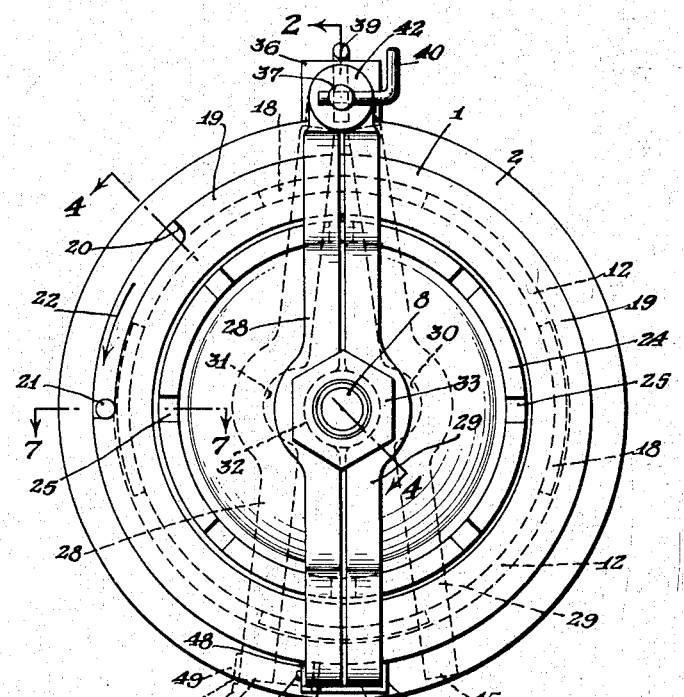
Figure 1 is a front elevation of the autoclave and closure means of my invention.

Referring now to Figure 2, I show an autoclave 1 having a reinforcement band 2 which is mounted on said autoclave in any suitable manner, preferably by shrinking said band onto the autoclave wall. The said autoclave 1 may be surrounded, when desired, by a temperature control jacket having suitable conduits for the transmission of heating or cooling mediums whereby the temperature of said autoclave may be controlled.

A breech block arrangement, hereinafter specifically described, is cut at 4 into the end of the wall of the autoclave 1. The reinforcement band 2 is therefore provided to compensate for the weakening effect on the said wall of said breech block arrangement. Also, the internal end pressure upon the closure may, if any difficulty should arise, be transmitted radially to the walls of the autoclave 1 in which case the tremendous concentration of pressure at the end of the autoclave may require reinforcement of said end.

A lid 5 having a rim 6 and a ledge 7 is mounted upon a hollow spindle 8 by means of the pin 9, the lid, spindle and pin being rigidly interengaged in any suitable manner, preferably by welding. The said lid 5 is then inserted into the recessed portion 10 of the end of the autoclave. The inside face including the rim 6 fits closely against the walls of the autoclave 1 in order to minimize any flashing of the gasket 11 which is mounted on the ledge 7, said gasket being formed preferably of soft to medium hard rubber non-gassing stock, and being arranged to fit tightly around the lid 5 at the ledge 7. Said gasket is also so dimensioned that, when not under compression, it too will fit tightly against the walls of the autoclave 1 but not so tightly as to impede the insertion or removal of the lid 5.

Figure 5:
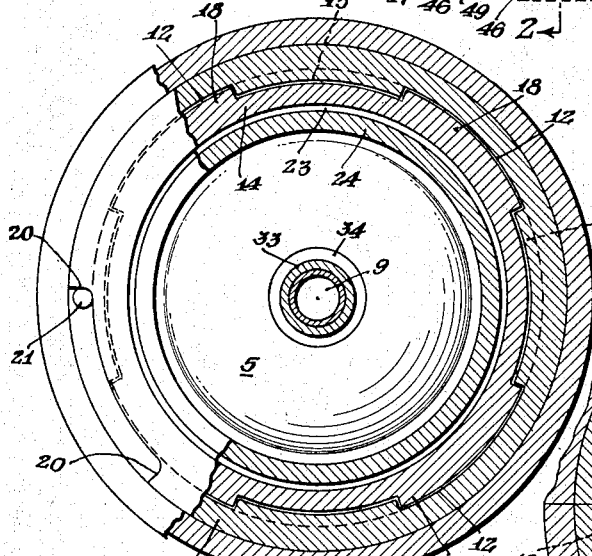
Figure 5 is a cross-sectional view taken on the line 5—5 of Figure 2, showing pressure sleeve moved to position for removal.
Figure 6:
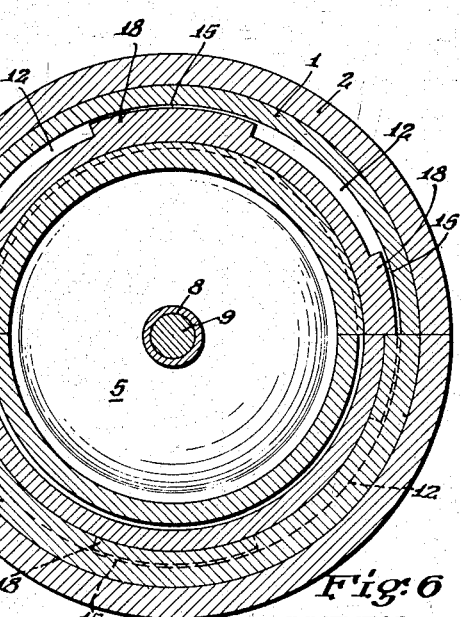
Figure 6 is a cross-sectional view taken on the line 6—6 of Figure 2.

The end of the autoclave at 4 comprises a breech block arrangement having flutes 12 (cf. Figures 4, 5 and 6) communicating with the base or seat 13 of the pressure sleeve 14 and recesses 15 (cf. Figures 2, 3 to 6) beneath the uncut or unfluted portions of the end of the autoclave wall 1, said uncut portions forming the retaining ledges 16. It will thus be clear that recesses 15 may be formed in the autoclave wall 1 by cutting an annular groove on the interior face thereof, forming thus a depression in the interior wall. The communicating flutes 12 may then be cut from the end 17 of the walls of the autoclave 1 through the body of said wall on the interior thereof until they communicate with said annular groove. The recesses 15 thus comprise such portions of the annular groove as lie immediately beneath the ledges 16 which are formed by the material remaining in the end 17 of the wall 1 after the flutes 12 are cut.

The pressure sleeve 14 also has a series of extruded flutes 18 along the sides and adjacent one end thereof, such flutes 18 being so dimensioned and spaced as to slide readily into the fluted grooves 12 of the end of the autoclave wall 1 and being of such length that when said pressure sleeve 14 is fully inserted into the end of the autoclave 1 and then rotated, the said flutes 18 will enter the recesses 15 beneath the ledges 16 in a position to engage said ledges 16 whereby unintended removal of said pressure sleeve 14 will be prevented. Any pressure upon the lid 5 which may be communicated to the pressure sleeve 14 will thus be communicated through the flutes 18 thereof to the ledges 16 and said ledges being formed of part of the material of the wall 1 of the autoclave and being further reinforced by the reinforcement band 2, are of sufficient strength to resist the maximum pressures which may be applied upon the lid 5.

It will thus be clear that after the lid 5 is in place, the only operation required to insert the pressure sleeve 14 and lock it in place is that of sliding its flutes 18 down the flutes 12 and then turning said sleeve until the flutes enter recesses 15 so that they may engage ledges 16.

Figure 7:
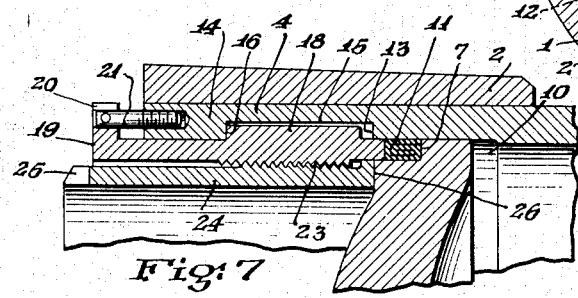
Figure 7 is a cross-sectional view taken on the line 7—7 of Figure 1.

The insertion and turning of said pressure sleeve 14 may be facilitated by forming a flange 19 (Figures 1 and 2) thereon. Said flange 19 has a cut out portion 20, (Figures 1, 4 and 5) cooperating with a stop stud or pin 21 (Figures 1 and 5) on the end of the autoclave wall which together guide the operator as to the proper positioning of the pressure sleeve 14, (see also Figure 7). When the pressure sleeve 14 is first inserted into the grooves 12, one end of the cut out portion 20 registers with the pin 21 as shown in Figure 1, and such relationship of cut-out 20 and pin 21 will indicate whether the flutes 18 of the pressure sleeve 14 are in registration with the flutes 12. When the pressure sleeve 14 and its flange 19 are then rotated in the direction indicated by the arrow 22 (Figure 1) to the position shown in Figure 5, the flutes 18 enter the recesses 15 so that they may engage the ledges 16 to prevent said pressure sleeve from being driven out.

The interior of the pressure sleeve 14 is threaded at 23 (Figure 2) and a thrust ring 24 similarly threaded may be engageable inserted into said pressure sleeve and securely positioned therein in any desired position. Said thrust ring 24 may have a series of slots or perforations 25 in the head thereof which may receive a tool for threading said thrust ring within the pressure sleeve. The thrust ring 24 may thus be threaded into the pressure sleeve 14 so that the end thereof bears against the recess or rim 26 of the lid 5.

The hollow spindle 8 is threaded along the greater part of its length at 27 (Figure 2) and passes between the split bars 28 and 29 (Figures 1 and 2). The split bars 28 and 29 are each curved at 30 and 31 respectively so that when secured together as shown by the solid lines of Figure 1 and in Figure 2, an orifice 32 (Figure 2) is provided through which the spindle 8 may pass.

A nut 33 (Figures 1 and 2) having shoulders 34 and 35 (Figure 2) is mounted and threaded on the spindle 8 and said nut 33 is mounted in the orifice 32 formed by the split bars 28 and 29 so that said bars are engaged between the shoulders 34 and 35 of the nut. The head or outer shoulder 35 of the nut 33 is in addition so formed as to permit the engagement thereof by a tool for ready rotation of the nut. It will thus be clear that rotation of the nut 33 will, by reason of the fixed mounting of said nut within the orifice 32 and the limitation of the movement of said nut by its shoulders 34 and 35, cause the spindle 8 to move either into or out of the autoclave and thus force a corresponding change in position of the lid 5.

It will also be clear that by reason of the centering of the spindle 8 by the pin 9 on the lid 5 and by reason of the extension of the spindle through the nut 33 and the orifice 32, the spindle is so arranged that it cannot vibrate or twist out of position, thereby ensuring that the lid 5 will always be in predetermined right-angular relationship to the walls 1 of the autoclave.

While, as hereinafter described, the arrangement of the parts of the autoclave closure herein set forth is such as to permit the removal of the entire closure apparatus as a single unit, nevertheless, the mounting of the split-bars 28 and 29 is so constructed as to also permit removal of separate parts of the closure member in the manner shown in my prior application herein referred to, such arrangement for removal of separate parts being however simpler and easier to operate.

A hinge-support boss 36 (Figures 1 and 2) is welded to the edge of the wall 1 of the autoclave. A bar hinge pin 37 is mounted in perforation 38 (Figure 2) of the hinge support boss, said bar hinge pin 37 being held in place by hinge stop pins 39 and 40 (Figures 1 and 2). Bar hinges 41 and 42 are welded respectively to split bars 28 and 29 and thus rotatably support said split bars upon the bar hinge pin 37. Lips 43 and 44 at either end of each of the split bars 28 and 29 (Figure 2) engage the flange 19 of the pressure sleeve 14 and thus securely mount said split bars upon the end of said pressure sleeve. The ends 45 and 46 of the split bars 28 and 29 are thus free to move apart from each other when desired (cf. Figure 1) and when each of said bars is rotated through an arc of almost 180°, then the lips 43 and 44 will be out of engagenmet with the flange 19. Likewise, when said split bars 28 and 29 are separated, they no longer engage the nut 33 and the spindle 8 is not then held in place by said bars. When said split bars 28 and 29 are to be secured together in the position shown by solid lines of Figure 1, then a bar lock 47 mounted by the extension 48 on the bar lock rivet 49 may be swung into position engaging the ends 45 and 46 of the split bars 28 and 29 and securing them together.

In the use and operation of this invention, the lid 5 mounted on the spindle 8 and carrying the gasket 11 is first slid into place as shown in Figure 2. Thereafter the pressure sleeve 14 is slid into the breech block arrangement as hereinbefore described and rotated so that the flutes 18 thereof lie within the recesses 15 and so that they may engage the ledges 16. The recess 15 is slightly longer than the flutes 18 to permit said pressure sleeve to move back and forth for purposes hereinafter described. Thrust ring 24 is then threaded into the pressure sleeve 14 so that it is fully enclosed thereby but not in cont act with lid 5. The split bars 28 and 29 are then locked in place over the entire assembly so that the orifice 32 thereof engages the nut 33 as shown in Figure 2 and as hereinbefore described. Then with the pressure sleeve in place, the nut 33 is rotated so as to pull the lid 5 out and compress the gasket 11 between the lid 5 and the pressure sleeve 14.

The compression of this gasket between the pressure sleeve and the lid is adjusted so that it corresponds to approximately 150 pounds per square inch pressure within the autoclave. It has been found that such a pressure is most desirable since it provides the best seal against leakage, the gasket at that degree of compression being most effective. The pressure of 150 pounds per square inch within the autoclave produces a pressure of 260 pounds per square inch on the gasket as will be more specifically pointed out hereinafter.

The construction of the closure member of my invention is designed to maintain the gasket at this compression throughout the high pressure gassing operation within the autoclave so that the most effective seal is constantly maintained, and so that the lid can be quickly and efficiently removed from the autoclave at the end of the operation. It is to be noted that this pressure of 260 pounds per square inch on the gasket provides the proper gasket seal even when pressures up to 3,000 to 5,000 pounds per square inch are used in the autoclave. The chamber is then evacuated, which is a necessary step in the gassing operation, but the engagement of the lid 5 and spindle 8 with the nut 33 and the split bars 28 and 29 maintains the lid in proper relation during this evacuation.

After the evacuation, the pressure within the chamber is raised until it corresponds to 150 pounds per square inch. At this point with, as has been pointed out, 260 pounds per square inch pressure on the gasket, the apparatus is adjusted to maintain the seal in this pressure condition permanently during the operation. This is effected by tightening up the thrust ring 24 until it bears against the lid 5 at the rim 26 (Figure 2). The gasket is now maintained between the pressure sleeve 14 and the lid 5 at a pressure of 260 pounds per square inch; and the thrust ring 24 by reason of its engagement and space maintenance between the pressure sleeve 14 and the lid 5 at 26, absolutely locks the lid 5 against further advance under the influence of the gas pressures within the autoclave. Thus, irrespective of the high pressures of the order of 3,000 to 5,000 pounds per square inch the lid cannot further advance to compress the gasket. Thus, the optimum sealing conditions are maintained throughout the operation and the gasket is unimpaired by the use.

Customarily, when the high pressures are exerted on the gasket, as in prior devices of this kind, the gasket flows under the high pressures and fails not only as a sealing device but presents difficulties in the separation of the lid and the autoclave. Also the radial pressure against the chamber wall in the vicinity of the gasket is enormously increased over the existing internal pressure by reason of the internal end pressure upon the lid being transferred upon the chamber wall through the gasket at the ratio of about 1:2.

By means of the interlocking and space maintenance nature of the component parts of my autoclave and closure device, the high pressures within the autoclave are absorbed by rigid metallic members which are unaffected thereby. Further, the nature of the arrangement of my apparatus provides for facility in assembly and subsequent dismantling at the termination of the operation.

After the gassing or pressure operation has been finished, and the pressure within the autoclave has been reduced to normal, the nut 33 is turned so that the shoulder 34 presses against the split bars 28 and 29 and thus, forcing the spindle 8 inwardly, also forces the lid 5 inwardly (see Figure 3) and provides a clearance between the thrust ring 24 and the rim 26 of the lid. It is then a simple matter to loosen the thrust ring by unscrewing it, if that is desired. Also, by the same operation of turning the nut 33, the pressure of the lid 5 on the gasket 11 and also on the pressure sleeve 14 is likewise released, so that pressure of the pressure sleeve flute 18 against the ledge 16 of the recess 15 is also released. Thereby, the pressure sleeve 14, with the thrust ring 24 may be turned to the position shown in Figures 4 and 5 where the pressure sleeve flutes 18 register with the flutes 12 of the autoclave wall (the breech block arrangement hereinbefore referred to) so that the entire assembly may be released.

It is to be noted that once the thrust ring 24 is screwed into contact with the lid in the beginning of the operation, the nut 33 and the split bars 28 and 29 are subjected to no stresses during the operation itself, no pressure is exerted thereon by the lid of the autoclave.

The split bars 28 and 29, the nut 33 and spindle 8 are employed to position the lid properly at the beginning of the process and to facilitate dismantling at the end of the operation.

Further, the arrangement of the split bars, nut, spindle and lid and the breach block arrangement of pressure sleeve 18 and autoclave wall permit a selective removal of the entire closure structure as a single unit or, if the operator so desires, in several parts.

The high pressures to which a gasket such as is customarily used in autoclaves of this nature is subjected, can be illustrated in an autoclave having a lid with a 10 inch diameter where the pressure inside the chamber reaches 5,000 pounds per square inch. Under this pressure, there is a total end pressure on the lid of approximately 400,000 pounds. This total end pressure is transmitted to the gasket. With a gasket of one inch width and one half inch face, the total area of the gasket will be:

14.5 square inches for the face
+31.5 square inches for the width
———
46.0 square inches With the 400,000 pounds pressure transmitted to this gasket area, the gasket is subjected to a pressure of about 8700 pounds per square inch. About ⅔ of this pressure is transmitted to the chamber wall or 5800 pounds per square inch above the 5000 pounds per square inch radial gas pressure to which the chamber wall is also exposed. As has been set forth above, a pressure of approximately 150 pounds per square inch in the chamber (amounting to a gasket pressure of $$\frac{150}{46} \times 80$$

or 260 pounds per square inch), places the gasket under proper pressure to obtain the best seal. A decidedly inferior sealing will be obtained and the gasket itself will be deleteriously affected when high pressures are transmitted directly to the gasket as in prior practice.

As a matter of fact the gasket will flow under these high pressure conditions and destroy the sealing and the ultimate separation of the lid from the autoclave is rendered exceedingly difficult. The gasket is usually permanently impaired when subjected to high pressures of this nature.

By means of the novel apparatus of my invention, the high pressure exerted on the lid is absorbed in large part by the thrust ring and pressure sleeve arrangement, by means of which the pressure upon the gasket itself is maintained at such low levels as have been found to give optimum results.

The particular advantage of the autoclave closure herein set forth over that described in my application S. N. 204,482, is that when desired, all of the parts of the closure may be removed as a single unit and where the operator desires, the various parts of this closure may however be removed individually.

For removal as a single unit after the pressure operation is completed, the nut 33 is turned as seen in Figure 3, to a position wherein shoulder 34 presses against the split bars 28 and 29 thus forcing the lid 5 into the autoclave. Since this operation is performed after the gassing operation is completed and since there is therefore no resistance to the inward movement of the lid 5 at that time, a simple tool adapted to fit over the head 35 of the nut will accomplish this result. When the lid 5 is thus forced in, pressure upon the thrust ring 24, the gasket 11, the pressure sleeve 14 and the pressure of the flutes 18 upon the ledges 16 is likewise released. The entire pressure sleeve 14 with the thrust ring mounted therein may then be rotated so that the flutes 18 register with the flutes 12 of the autoclave wall, thus providing a free unobstructed path for the removal of the pressure sleeve and its component parts from the autoclave. Obviously, the flange 19 of the pressure sleeve may rotate within the lips 43 and 44 of the split bars 28 and 29.

It will thus be noted that even though as in Figures 3 and 4, the pressure sleeve has thrust rings which are arranged to permit removal of these members from the autoclave end, the lid 5, the spindle 8 and the split bars 28 and 29 are still connected with and mounted on the pressure sleeve 14 by the engagement of the lips 43 and 44 with the flange 19. The hinge stop pins 39 and 40, Figure 2, are then removed from their corresponding perforations so that the hinge pin 37 is free to slide out of the hinge support boss 36.

It will now be clear that there is absolutely no physical connection between the entire autoclave closure unit and the autoclave wall especially since the flutes 18 of the pressure sleeve 14 now register with the flutes 12 of the autoclave wall and the hinge stop pins 39 and 40 have been removed. Therefore, a pull upon the spindle 8 will cause the withdrawal as a single unit of the lid, spindle, pressure sleeve, thrust ring, split bars, and nut. The spindle 8 is therefore hollow in order to facilitate this result.

A bar or handle may be inserted at the hollow end or opening 50 of the spindle and may be pushed in any desired or convenient distance up to the pin 9. A drift pin or other holding means may then be inserted in the perforation 51 (Figure 3) of the spindle in order to bind the bar or handle and the spindle 8 into a straight unit. Thereafter a withdrawal of the bar or handle will effect a corresponding withdrawal of the spindle 8 and a corresponding withdrawal of the entire closure structure.

The bar or handle to be inserted in the hollow or open end 50 of the spindle 8 may, of course, be maintained upon any support which may be convenient or necessary, particularly in view of the specific dimensions of the autoclave or its closure. Thus, where the closure members are large and heavy, the bar or handle may be mounted upon any suitable crane or other device. Where the members are small and thus relatively light, the withdrawal may be a hand operation.

In the event that it should be desired to remove the parts of the autoclave closure individually in the manner generally shown in my prior application S. N. 204,482, then the arrangement of the split bars 28 and 29 is found to be far more convenient than the corresponding arrangement of cross bars in said prior application. And likewise, the breech block arrangement of the flutes 18 and 12 permit the rapid withdrawal of the pressure sleeve 14.

As shown in Figures 1 and 2, the mounting of the split bars 28 and 29 upon the hinge pin 37 permit said bars to be separated at their ends 45 and 46 and swung about the hinge pin 37 until the lips 43 and 44 are out of engagement with the flange 19 of the pressure sleeve 18. In this way the nut 33 is released from the orifice 32 formed by these split bars and the spindle is thus free to be moved out of the autoclave. Likewise when the split bars are thus separated and turned out of the way, the pressure sleeve 14 when it is turned to the position shown in Figure 4, may also be slipped out without interference from the spindle mounting. Also, if it is so desired, the thrust ring 24 may be unscrewed and separately removed once the split bars 28 and 29 are out of the way.

Although in Figure 1 I have shown the hinge pin and hinged mounting of the split bars 28 and 29 at the top of the autoclave, the optimum result is obtained when the hinge support boss 36 and the hinge pin 37 is located at the bottom of the autoclave. In this way, then, when the lock 47 is released and the ends 45 and 46 of the split bars 28 and 29 are thus freed and separated it requires no positive hold of any kind in order to retain the split bars 28 and 29 in released unobstructing position since then of their own weight they will drop down rotating about the hinge pin 37 to a point where they will not interfere with the autoclave end opening and where gravity alone is sufficient to maintain them in unobstructing position. Thus, the advantages of this arrangement of the autoclave closure comprise a simplified retaining means comprising the split bars 28 and 29 for the spindle 8, a simplified arrangement of the nut 33 which permits rotation of a single member to effect motion of the lid 5 either into or out of the end of the autoclave, a simplified breech block mounting for the pressure sleeve within the autoclave wall which permits a rapid and almost instantaneous removal of said pressure sleeve and its associated thrust ring when that is desired, a simplified mounting of the split bars 28 and 29 which permits them to be moved out of the way in a single rapid operation, and especially a means for combining all of the units of the autoclave and closure into virtually a single member for removal of all of the end closure parts simultaneously.

Many variations in the closure structure herein described should now be obvious to those skilled in the art. I prefer, therefore, to be limited not by the specific disclosures contained herein but by the appended claims.

I claim:

1. A pressure chamber having an opening; a closure for said opening enterable into said opening; a pressure sleeve enterable into said opening; and means carried by said pressure sleeve for maintaining said closure in said opening; additional means interconnecting said pressure sleeve and said closure member comprising a spindle mounted on said closure member, split bars forming an orifice engaging said spindle, a flange on said pressure sleeve, lips on said split bars engaging said flange, said split bars comprising two members hingedly mounted at one end of each thereof at a point on the end wall of the pressure chamber; and means on the opposite ends of said split bars locking them together across the end of the pressure chamber; said split bars being releasable from their hinge mounting on the pressure chamber for removing the closure assembly as a single unit.

2. A pressure chamber having an opening; a closure for said opening enterable into said opening; a pressure sleeve enterable into said opening; and means carried by said pressure sleeve for maintaining said closure in said opening; additional means interconnecting said pressure sleeve and said closure member comprising a spindle mounted on said closure member, split bars forming an orifice engaging said spindle, a flange on said pressure sleeve; members on said bars releasably engageable with said flange, said split bars comprising two members hingedly mounted at one end of each thereof at a point on the end wall of the pressure chamber; and means on the opposite ends of said split bars locking them together across the end of the pressure chamber; said split bars being releasable from their hinge mounting on the pressure chamber for removing the closure assembly as a single unit.

3. A pressure chamber having an opening; a closure for said opening enterable into said opening; a pressure sleeve enterable into said opening; and means carried by said pressure sleeve for maintaining said closure in said opening; additional means interconnecting said pressure sleeve and said closure member comprising a spindle mounted on said closure member, split bars forming an orifice engaging said spindle, a flange on said pressure sleeve, lips at one end of each of said split bars engaging said flange; and members at the other end of each of said bars releasably engageable with said flange, said split bars comprising two members hingedly mounted at one end of each thereof at a point on the end wall of the pressure chamber; and means on the opposite ends of said split bars locking them together across the end of the pressure chamber; said split bars being releasable from their hinge mounting on the pressure chamber for removing the closure assembly as a single unit.

4. A pressure chamber having an opening; a closure for said opening enterable into said opening; a pressure sleeve enterable into said opening; and means carried by said pressure sleeve for maintaining said closure in said opening; additional means interconnecting said pressure sleeve and said closure member comprising a spindle mounted on said closure member, split bars defining an orifice, a nut mounted in said orifice and rotatable therein; said spindle being in threaded engagement with said nut; rotation of said nut adjusting the position of said spindle and the closure member; a flange on said pressure sleeve, lips on said split bars engaging said flange, said split bars comprising two members hingedly mounted at one end of each thereof at a point on the end wall of the pressure chamber; and means on the opposite ends of said split bars locking them together across the end of the pressure chamber; said split bars being releasable from their hinge mounting on the pressure chamber for removing the closure assembly as a single unit.

HANS PFLEUMER.